No. 764,110. PATENTED JULY 5, 1904.
J. W. CHEATHAM.
COTTON PLANTER.
APPLICATION FILED SEPT. 5, 1903.
NO MODEL.
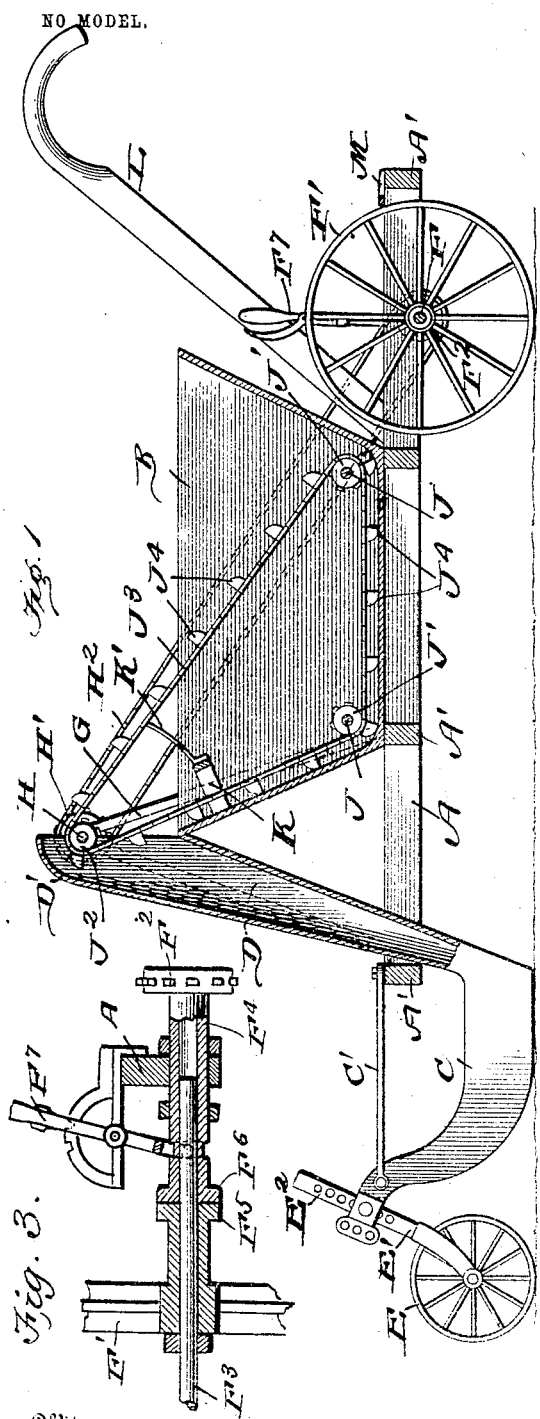
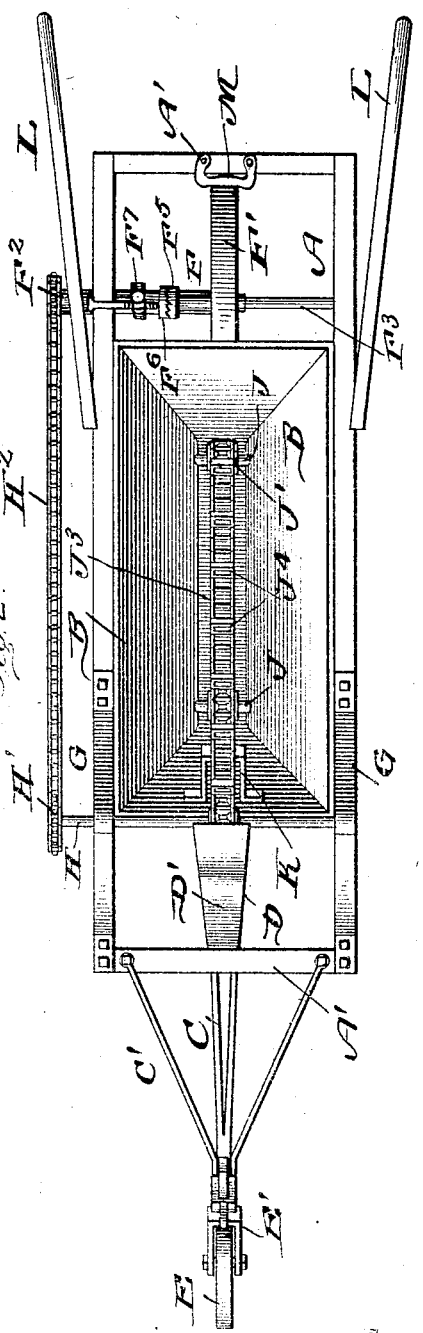
Inventor
James W. Cheatham,
By O'Meara & Brock
Attorneys
Witnesses No. 764,110. Patented July 5, 1904.

UNITED STATES PATENT OFFICE.

JAMES WESLEY CHEATHAM, OF WHEATLEY, TENNESSEE.

COTTON-PLANTER.

SPECIFICATION forming part of Letters Patent No. 764,110, dated July 5, 1904.

Application filed September 5, 1903. Serial No. 172,105. (No model.)

*To all whom it may concern:*

Be it known that I, JAMES WESLEY CHEATHAM, a citizen of the United States, residing at Wheatley, in the county of Benton and State of Tennessee, have invented a new and useful Cotton-Planter, of which the following is a specification.

My invention is an improvement in cotton-planters; and the object of my invention is to plant a number of cotton-seeds (five or six) in one place, each half-dozen or so being spaced a predetermined distance from the ones last planted, and a further object is to plant the seed at the proper depth.

My invention consists of the novel features of construction and combination of parts hereinafter shown and described, particularly pointed out in the claims, and shown in the accompanying drawings, in which—

Figure 1 is a longitudinal section through my planter, parts being shown in section; and Fig. 2 is a plan view of the same. Fig. 3 is a longitudinal section through a clutch.

In carrying out my invention I employ a rectangular frame A, having the cross-pieces A' and having centrally resting thereon a hopper-shaped receptacle B, open at the top and closed at the bottom.

Arranged in advance of the frame and having its rear portion extending under the front end piece of the frame is a shoe C, the side members of said shoe being rearwardly divergent, as shown in Fig. 2. Extending from the forward end of the hopper B to the rear end of the shoe C is a chute D. The front wall D' of the chute extends upwardly above the plane of the top of the hopper and is curved rearwardly at its upper end to form a hood for the chute. The rear wall of the chute is cut away at the top of the hopper, so that the portion of the chute above the plane of the top of the hopper is rearwardly open. At its lower end the chute discharges between the side members of the shoe. A lead-wheel E is journaled on a stub-axle carried at the lower end of a bifurcated bracket E'. This bracket has a perforated bar $E^2$ extending upwardly and rearwardly from the top of the bracket and the forward ends of the shoe C are coupled to said bar by a suitable pin passing through one of the perforations of the bar $E^2$. Suitable brace-rods C' extend from the forward end piece of the frame A to the forward portion of the shoe and serve to hold same rigid. A compound shaft F is journaled in the frame A to the rear of the hopper, projecting beyond the frame on one side. A wheel F' is loosely fixed on this shaft in alinement with the shoe, and on the projecting end of the shaft is fixed a sprocket-wheel $F^2$. Adjacent to the forward end of the hopper the frame carries upwardly-extending inclined standards G, connected at their upper ends to the sides of the chute D, and journaled in the standards adjacent the hood of the chute is a rotatable shaft H, also projecting outward in the same manner as the shaft F. On the outer end of this shaft is fixed a sprocket-wheel H', and a sprocket-chain $H^2$ runs from the wheel $F^2$ to the wheel H', transmitting rotation from the shaft F to the shaft H.

The sides of the hopper are downwardly converging, and adjacent the bottom of the hopper are stub-shafts J, carrying idle sprocket-wheels J', arranged adjacent the front and rear walls of the hopper, respectively. A drive-sprocket $J^2$ is fixed on the shaft H in alinement with the idle sprocket-wheels J'. A sprocket-chain $J^3$ runs over the sprocket-wheels J' and $J^2$, and this chain carries cups $J^4$, arranged at regular intervals on the chain, and each of these cups is designed to hold five or six of the cotton-seeds. A bracket K is arranged on the inner side of the front wall of the hopper and carries a spring K' of the leaf type, which contacts with the under side of the sprocket-chain $J^3$. Handles L are arranged on the rear portion of the frame A.

The operation of my device is as follows: The hopper B is filled with cotton-seed, the lead-wheel E is adjusted, and the device started, the wheel F' traveling on the ground and rotating the shaft F. The travel of the chain $J^3$ will convey the seed in the cups $J^4$ over the sprocket-wheel $J^2$, and as the cups pass over said wheel they will dump the seed into the chute D, and it will fall into the furrow opened by the shoe C. The rapidity of travel of the chain $J^3$ is regulated by the size of the sprocket-wheel $J^2$, and it is obvious that by decreasing the speed of the chain the seeds will be dropped at a correspondingly-greater distance apart. To prevent the chain itself from carrying seed to the chute and delivering in a steady stream, the leaf-spring K' is provided. The free end of this spring strikes the chain and dislodges any seed that may be clinging to the chain. The adjustment of the lead-wheel by means of the pin and perforated bar will regulate the depth of the furrow opened by the shoe. To stop the feed, the following-described clutch mechanism is employed: The compound shaft F comprises a rigid solid portion F³, journaled at one end in a side of the frame A, passing through the elongated hub of the wheel F' and loosely journaled at its other end in a sliding hollow shaft F⁴, which carries the sprocket-wheel F². The hub of the wheel F' carries a clutch portion F⁵, which is adapted to engage a clutch portion F⁶ on the shaft F⁴. A lever F⁷, working on a quadrant, is pivoted at its lower end to the shaft F⁴, which is slidably journaled in one side of the frame A and moves it in and out of contact with the clutch F⁵ of the hub. A scraper M is arranged on the end of the frame to keep the wheel F' free of dirt and mud.

Having thus fully described my invention, what I claim as new, and desire to secure by Letters Patent, is—

1. A cotton-planter comprising a hopper having a solid horizontally-arranged bottom, a discharge-chute arranged at one end of the hopper, and an endless conveyer adapted to travel from the bottom of the hopper opposite the end at which the discharge-chute is arranged to the upper end of the discharge-chute and to return along on and parallel with the bottom of the hopper.

2. A device of the kind described comprising a hopper open at the top and closed at the bottom, a chute arranged adjacent the hopper, said chute being downwardly open at its lower end and laterally open adjacent its upper end, an endless conveyer arranged in and traveling along the bottom of said hopper through a triangular path one portion of said path being parallel to the bottom of the hopper, and means carried by said conveyer for delivering a predetermined amount of seed to the upper portion of the chute at predetermined intervals of time.

3. A device of the kind described comprising a hopper, a chute arranged adjacent the hopper, said hopper being closed at the bottom, an endless chain traveling in said hopper, and cups carried by said chain, said cups being adapted to dump seed from the hopper into the chute and to engage the bottom of the hopper during rearward travel of the cups.

4. A device of the kind described comprising a hopper having a solid bottom, a chute adjacent thereto, an endless chain traveling from the bottom of the hopper to the top of the chute, cups arranged on said chain, and means arranged on a side of the hopper and adapted to dislodge seed carried on the chain before same reaches the chute.

5. A device of the kind described comprising a hopper, a chute arranged adjacent the hopper, an endless chain in the hopper, means arranged on the chain and adapted to convey seed to the chute, and a leaf-spring carried by a side of the hopper and adapted to have its free end in contact with the chain as and for the purpose described.

JAMES WESLEY CHEATHAM.

Witnesses:
J. B. BOWLES,
J. W. NICHOLS.